Oct. 10, 1939.　　　C. A. CHAYNE　　　2,175,429
STEERING LINKAGE
Filed July 26, 1937

Inventor
Charles A. Chayne
By Blackmore, Spencer & Flint
Attorneys

Patented Oct. 10, 1939

2,175,429

UNITED STATES PATENT OFFICE 2,175,429

STEERING LINKAGE

Charles A. Chayne, Flint, Mich., assignor to General Motors Corporation, Detroit, Mich., a corporation of Delaware Application July 26, 1937, Serial No. 155,620

5 Claims. (Cl. 280—95)

This invention relates to detail structural improvements in the steering linkage for motor vehicles wherein a long tie rod connects the wheel on one side of the vehicle with the pitman arm of the steering gear box mounted on the other side of the vehicle and a short tie rod connects the other wheel with an intermediate portion of the first tie rod.

An object of the invention is to improve the interconnected tie rod structure and facilitate its economical manufacture and also enable easy and convenient adjustment of the parts for setting the wheels properly in relation to each other.

A further object of the invention is to provide an improved mechanical design at the inner end of the long tie rod which houses the spaced sockets for the ball seats of the pitman arm and the inner end of the short rod with a hollow spacer between the socket which also affords a lubricant reservoir feeding both joints.

Figure 1:
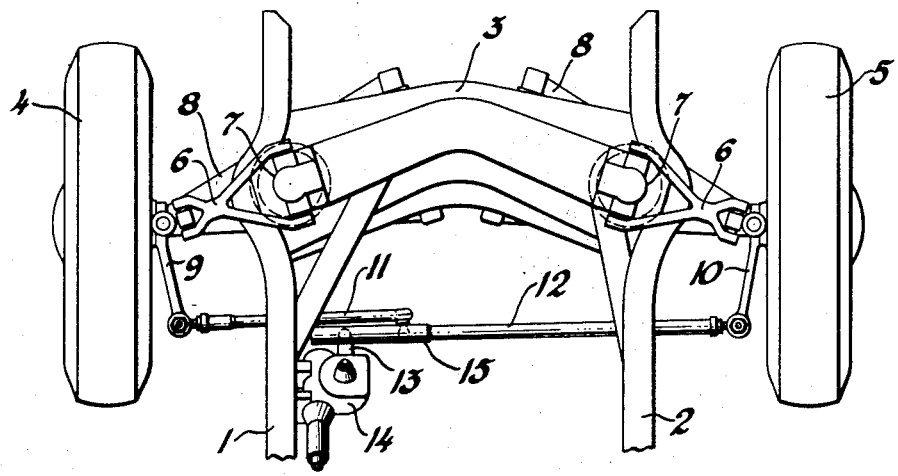
Figure 2:
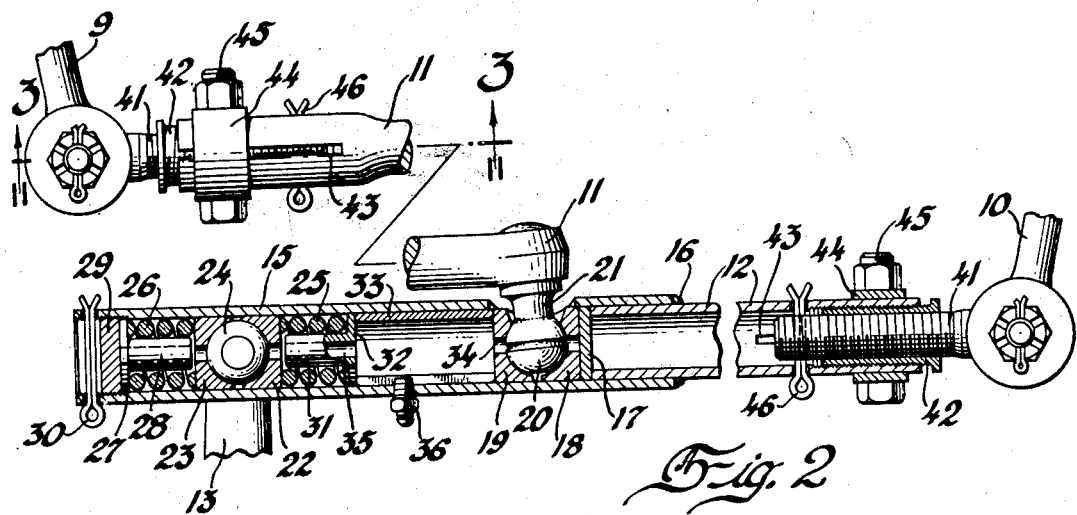
Figure 3:
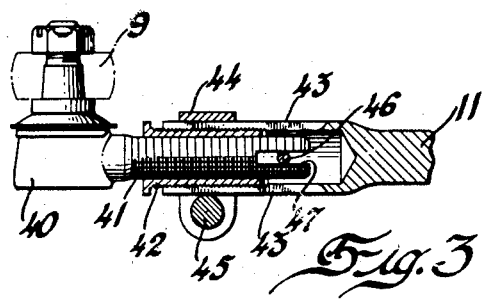
Figure 4:
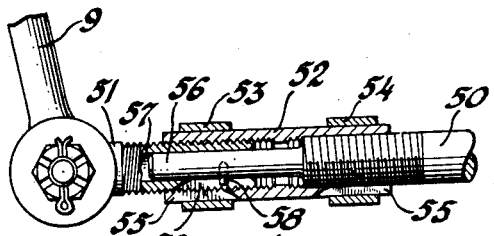

Additional objects and advantages will become apparent during the course of the following specification having reference to the accompanying drawing wherein Figure 1 is a top plan view of the front portion of a motor vehicle showing the steering linkage; Figure 2 is an enlarged detail view, partly in section, of the interconnected tie rods; Figure 3 is a detail section taken on line 3—3 of Figure 2, and Figure 4 is a sectional view of a modified tie rod end.

In the drawing the numerals 1 and 2 indicate a pair of side members of a vehicle chassis and 3 is the front frame member. A well known type of independent suspension assembly is used for mounting the front of the frame upon the steerable road wheels 4 and 5 on opposite sides of the frame. Each suspension assembly includes an upper arm 6 connected at its outer end to the wheel knuckle support and at its inner end to the shaft of the shock absorber 7 on top of the cross member 3 and a lower load supporting arm 8 also connected at its outer end to the knuckle support and pivoted at its inner end to the underside of the frame member 3 for swinging movement about an axis inclined to the longitudinal center line of the vehicle in convergent relation to the axis of the suspension arm of the other wheel. A rearwardly projecting steering arm 9 is associated with the spindle for the wheel 4 and a similar steering arm 10 is associated with the spindle of the wheel 5. These arms are connected to the outer or remote ends of a pair of transversely extending interconnected tie rods 11 and 12 having their inner ends in transversely overlapping relation with the inner end of the short link 11 joined to an intermediate portion of the long link 12 and with the inner end of the long link 12 connected to and supported by the pitman arm 13 which forms a part of the steering column assembly including the gearbox 14 mounted on the frame member 1 in offset relation to the vehicle center line. The offset relation of the steering gear affords the necessary clearance for the engine or power plant mounted in the front end of the frame.

The structure at the inner end of the long rod 12 includes a tube 15 sleeved at one end upon the end of the rod and secured thereto as by welding, indicated at 16. Optionally the parts 12 and 15 may comprise a single piece of tubing with the enlarged end portion formed by expanding the same or by contracting the portion therebeyond in accordance with conventional tube forming practice. Housed within the tube 15 and bearing against the end of the rod 12 is a closure disc or abutment plate 17 for the seat 18 which cooperates with a corresponding seat 19 to form a socket for the ball 20 on the stud 21 at the inner end of the rod 11. In spaced relation to this ball socket is a similar socket afforded by the seats 22 and 23 to receive the ball 24 carried by the pitman arm 13. For convenience and economy of manufacture the several seats may be identical. To center the parts, cushion shock and take up wear a pair of compression springs 25 and 26 are positioned on opposite sides of the mating seats 22 and 23 with the opposite end of the spring 26 seating against the flanged head 27 of the movement limiting pin 28 seated against the closure plug 29 which is threaded in the end of the tube 15 and held against displacement by the cotter pin 30. A similar pin 31 through its flanged head 32 is provided to seat the spring 25 and in turn is seated against one end of a hollow spacer sleeve 33 whose opposite end bears against the seat 19. The spacer sleeve 33 is slidable within the tube 15 and transmits spring force against the seat 19 for taking up wear between the bearing surfaces of the ball 20 and its socket. Use is made of the hollow sleeve 33 to contain a supply of lubricant for feeding both joints and accordingly the ball seats are provided with ports as at 34 and the pin 31 with a drilled opening 35 for leading lubricant from the hollow spacer 33 to the respective bearing surfaces. To introduce lubricant into the reservoir, the pressure fitting 36 is threaded through the wall of the tube 15 and projects into an opening or slot in the sleeve 33, serving as a key to prevent rotation of the rolled up spacer and thereby insure an open path for lubricant through the fitting to the interior storage space.

At the outer end of the rod 12 connection is made to the steering arm 10 through a conventional ball joint which includes a housing 40 having a threaded stud 41 projecting therefrom for reception within the hollow end of the rod 12. Interposed between the rod and stud is a rotatable sleeve 42 having interior and exterior threads of opposite hand engaging the interior of the tubular end of the rod 12 and the exterior of the stud 41. Through rotation of the sleeve 42 the effective length of the rod 12 may be varied to adjust the inclination of the road wheel with reference to the steering gear. A similar connection is made between the outer end of the short rod 11 and the steering arm 9 whereby the two wheels may be adjusted independently of each other for proper toe-in relation. To set the parts in adjusted position each tie rod end is axially split as at 43 and is embraced by an encircling split clamp 44 which may be drawn up by a bolt 45 to contract the end of the rod about the sleeve 42. To prevent relative rotation of the rod and the stud a cotter pin 46 or the like is projected through diametrically opposite openings in the tube and enters a keyway or slot in the end of the stud as shown at 47 in Figure 3.

As an alternative end adjustment there may be employed the structure of Figure 4 wherein both the tie rod 50 and the housing stud 51 are exteriorly threaded, one being a right-hand thread and the other a left-hand thread, and are coupled by a rotatable interiorly threaded sleeve 52 whose rotation effects variation in length of the tie rod. Clamping bands 53 and 54 on opposite ends of the sleeve 52 contract the sleeve by reason of the end slots 55 for holding the parts in adjusted position. To guide and key the rod and stud the rod may be provided with a projecting pin 56 piloted within a drilled opening 57 in the stud and keyed thereto by the key 58 carried by the pin 56 and located slidably within an axial keyway or slot 59 in the wall of the stud 51.

I claim:

1. The combination with a movable steering member and a pair of steerable wheels, of a pair of tie rods extending inwardly from the wheels and having their inner end portions in transversely overlapping relation, one of said end portions including a tubular element sleeved on the end of the rod portion extending to the steering member, a ball socket housed within the element adjacent said rod portion end to receive a ball stud on the end of the other rod, a second ball socket housed within the element adjacent its end to receive said steering member, a combined lubricant storage container and hollow spacer between said sockets and means to supply lubricant from said container to both sockets.

2. A tie rod end including a hollow member to be secured at one end to the tie rod, a ball receiving socket housed within the member adjacent said end, a pair of mating ball seats housed within the opposite end of said member, opposing springs bearing on said seats, an adjustable plug seating one of said springs and a spacer seating the other spring at one end and bearing on said socket at the other end.

3. A tie rod end including a hollow member to be secured at one end to the tie rod, a pair of spaced ball receiving sockets housed within said member and each including a pair of mating seats, means spacing said sockets including a hollow lubricant containing tube and a spring arranged end to end and engaging adjacent seats of said sockets, a rigid abutment for the remote seat of one socket, a spring abutment for the remote seat of the other socket and means to supply lubricant to both sockets from said tube.

4. Steering linkage for a pair of dirigible wheels including a pair of rods having their inner ends in transversely overlapping relation and having wheel connections at their outer ends, adjustable means in each rod for independently varying their effective length, cooperating pivot joint members associated with the overlapping end portions, a second set of joint members for connecting one of said rods to a steering arm, the joint members associated with said rod being spaced apart longitudinally of the rod, a hollow spacer slidably mounted in the rod between said members and provided in the wall thereof with an elongated slot, a lubricant fitting carried by the rod and projected into the slot of the slidable spacer and means to feed lubricant from the hollow spacer to both of the joints.

5. For use with steering linkage wherein a rod is pivotally connected at opposite ends to a steering arm and one of a pair of dirigible wheels and is pivotally connected adjacent said steering arm connection with a link joined to the other of the dirigible wheels, a hollow rod end having a pair of spaced side openings to receive pivot members of the steering arm connection and the link connection, respectively, bearing seats housed within said rod end for the pivot members, a hollow spacer slidably positioned within said rod end between the bearing seats and adapted to contain a supply of lubricant for feed to the bearing seats at opposite ends thereof, and means to supply lubricant to said slidable spacer, including a nipple carried by the wall of the rod end and projected through an elongated opening in the spacer.

CHARLES A. CHAYNE.